(12) United States Patent
Reiter et al.

(10) Patent No.: US 12,314,123 B2
(45) Date of Patent: May 27, 2025

(54) PROGRAMMABLE FAULT VIOLATION FILTER

(71) Applicant: Microchip Technology Incorporated, Chandler, AZ (US)

(72) Inventors: Andreas Reiter, Feldkirchen-Westerham (DE); Yong Yuenyongsgool, Gilbert, AZ (US); Stephen Bowling, Chandler, AZ (US); Alex Dumais, Boise, ID (US); Justin Oshea, Chandler, AZ (US); Sankar Rangarajan, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 69 days.

(21) Appl. No.: 18/096,163

(22) Filed: Jan. 12, 2023

(65) Prior Publication Data

US 2023/0393923 A1 Dec. 7, 2023

Related U.S. Application Data

(60) Provisional application No. 63/348,383, filed on Jun. 2, 2022.

(51) Int. Cl.
*G06F 11/00* (2006.01)
*G06F 11/07* (2006.01)

(52) U.S. Cl.
CPC ........ *G06F 11/0772* (2013.01); *G06F 11/076* (2013.01); *G06F 11/0781* (2013.01)

(58) Field of Classification Search
CPC . G06F 11/0772; G06F 11/076; G06F 11/0781
See application file for complete search history.

(56) References Cited

U.S. PATENT DOCUMENTS

| | | | |
|---|---|---|---|
| 2011/0153236 A1 | 6/2011 | Montreuil et al. | 702/59 |
| 2014/0218316 A1* | 8/2014 | Chen | G06F 11/3062 345/173 |
| 2015/0330841 A1 | 11/2015 | Kern et al. | 700/275 |
| 2016/0266605 A1* | 9/2016 | Hegde | G06F 1/06 |
| 2023/0393923 A1* | 12/2023 | Reiter | G06F 11/0781 |

OTHER PUBLICATIONS

International Search Report and Written Opinion, Application No. PCT/US2023/024295, 10 pages.

* cited by examiner

*Primary Examiner* — Philip Guyton
(74) *Attorney, Agent, or Firm* — SLAYDEN GRUBERT BEARD PLLC (57) ABSTRACT

A fault event monitor and filter having a digital comparator receiving a digital input value, wherein the digital comparator generates a plurality of outputs based on programmable threshold input values, a first counter coupled to a first output of the plurality of outputs of the digital comparator, a second counter coupled to a second output of the plurality of outputs of the digital comparator, and an output controller with a first input coupled to an output of the first counter and with a second input coupled to an output of the second counter, wherein the output controller to generate a fault event signal based at least partially on signals received from the first and second counters.

9 Claims, 5 Drawing Sheets

PROGRAMMABLE FAULT VIOLATION FILTER

RELATED PATENT APPLICATION

This application claims priority to commonly owned U.S. Patent Application No. 63/348,383 filed Jun. 2, 2022, the entire contents of which are hereby incorporated by reference for all purposes.

TECHNICAL FIELD

The present disclosure relates to filtering and fault handling of error conditions in electronic devices.

BACKGROUND

Monitoring of operational parameters and conditions is vital in many electronics applications. In power supply applications, failure to properly detect and react to operational parameters and conditions including over-voltage and over-current may result in thermal damage or larger system errors. In motor control applications, failure to properly detect and react to error conditions may result in physical damage to the larger system.

Existing solutions may implement an Interrupt Service Routine (ISR) in software. A processor, microcontroller, central processing unit (CPU) or other device, generally referred to herein as a processor, may receive notification when the system is operating outside the safe and valid operating region in the form of an interrupt signal. The processor may receive the interrupt signal and respond appropriately. The safe and valid operating region may be defined by various thresholds of allowable currents, voltages, temperatures and other parameters. An excursion of the operating parameter or condition beyond the defined threshold may be termed a threshold violation. A comparator may make a comparison of the operating parameter or condition with the threshold of the safe and valid operating region to determine if a threshold violation has occurred.

Robust detection of error conditions also requires filtering of the comparator output. A filter may suppress very short durations outside the safe and valid operating region, as a one or more violations of a threshold for a very brief duration may not require a system level response. A processor may include a simple software filter to suppress noise by averaging the ADC results coming into the comparator. However, software-based filtering and ISR solutions are susceptible to a number of issues.

First, the ISR is a complicated piece of software that has many dependencies that may not be adequately addressed in the software routine. The ISR is dependent on the processor having free cycles to respond to the interrupts in a timely manner. If the processor is busy with higher-priority tasks, an incoming interrupt may not be addressed in time to prevent larger system impacts. In order to quickly service interrupts and avoid this type of failure, the ISR must operate at a high execution rate, which consumes system power. There may also be additional overhead to support task switching which may further impact latency.

Additionally, software protection may be considered unsafe in some applications. Software solutions are much more susceptible to outside interference via hacking, malware or other malicious interference. It may be preferred to have a solution which runs as an independent feature in hardware external from the processor and thus enhances robustness for safety critical applications.

Traditional solutions which involve keeping track of the threshold violations in software can take up system resources in processing every corresponding interrupt. This is especially true in high switching power converters where the control loop is not executed on a cycle-to-cycle basis and not every violation is significant.

Existing hardware-based fault protection and filtering methods may utilize either design and tuning of external hardware circuits and/or expensive, valuable on-chip resources such as analog comparators. Such hardware protection is expensive and thus reserved for the most critical conditions only.

There is a need for an improved implementation of a hardware system that provides efficient filtering of threshold violations, increases the robustness of the system, and decreases the load on the processor.

SUMMARY

A fault event monitor and filter may include a digital comparator to receive a digital input value, wherein the digital comparator generates a plurality of outputs based on respective programmable threshold input values, a first counter coupled to a first output of the plurality of outputs of the digital comparator and an output controller with a first input coupled to an output of the first counter, the output controller to generate a filtered fault event signal based at least partially on the output of the first counter.

A fault event monitor and filter may include a digital comparator receiving a digital input value, wherein the digital comparator generates a plurality of outputs based on programmable threshold input values, a first counter coupled to a first output of the plurality of outputs of the digital comparator, a second counter coupled to a second output of the plurality of outputs of the digital comparator, and an output controller with a first input coupled to an output of the first counter and with a second input coupled to an output of the second counter, wherein the output controller to generate a fault event signal based at least partially on signals received from the first and second counters.

A microcontroller comprising a programmable threshold violation filter may include digital comparator receiving a digital input value, wherein the digital comparator generates a plurality of outputs, a first counter coupled to at least one of the plurality of outputs of the digital comparator, a second counter coupled to at least one of the plurality of outputs of the digital comparator, and an output controller with a first input coupled to an output of the first counter and with a second input coupled to an output of the second counter, wherein the output controller to generate a fault event signal when the first counter exceeds a first programmable counter limit and to reset the fault event signal when the second counter exceeds a second programmable counter limit.

A method for monitoring and filtering fault events may include providing a digital comparator to generate a plurality of outputs based upon an input value, incrementing a first counter based on a first output of the digital comparator, incrementing a second counter based on a second output of the digital comparator and the output of the first counter, resetting the first counter based on a programmable condition, resetting the second counter based on a programmable condition, and generating an output based on the first counter value and the second counter value and a programmable condition.

BRIEF DESCRIPTION OF THE DRAWINGS

The figures illustrate example circuits and systems for fault handling of error conditions in electronic systems.

DESCRIPTION

Microcontrollers are systems on a chip that generally comprise a processor, a memory, a plurality of input/output ports, and a variety of peripheral devices. In particular, a variety of devices can be provided such as configurable logic cells, complementary waveform/output generators, dedicated arithmetic units, numerical controlled oscillators and programmable switch mode controllers, which may operate mostly independently from the processor, and therefore may be termed core independent peripheral (CIP) devices. These peripheral devices allow embedded device engineers to simplify their designs and create ever more creative applications and products.

A core independent peripheral (CIP) is thus a peripheral device in a microcontroller that does not require support from a processor in the microcontroller for its operation. The processor may initialize and configure such a peripheral device. In various examples, a peripheral device may be initialized and configured by a flash memory or other storage device. Thus, once such a CIP device is configured and enabled, for example by the processor, it operates on its own and frees processing power of the processor for other tasks. For example, a counter, once triggered, starts counting independently from the processor, and a direct memory access controller performs block transfers from/to memory without processor interaction. Using CIPs decreases parts count, manufacturing costs, and increases reliability and versatility of a product. Many products greatly benefit from such cost savings, increased versatility, and reliability. One such product may be used for monitoring and threshold violations of operational parameters and issuing fault events based on a filtered output of the threshold violations.

Figure 1:
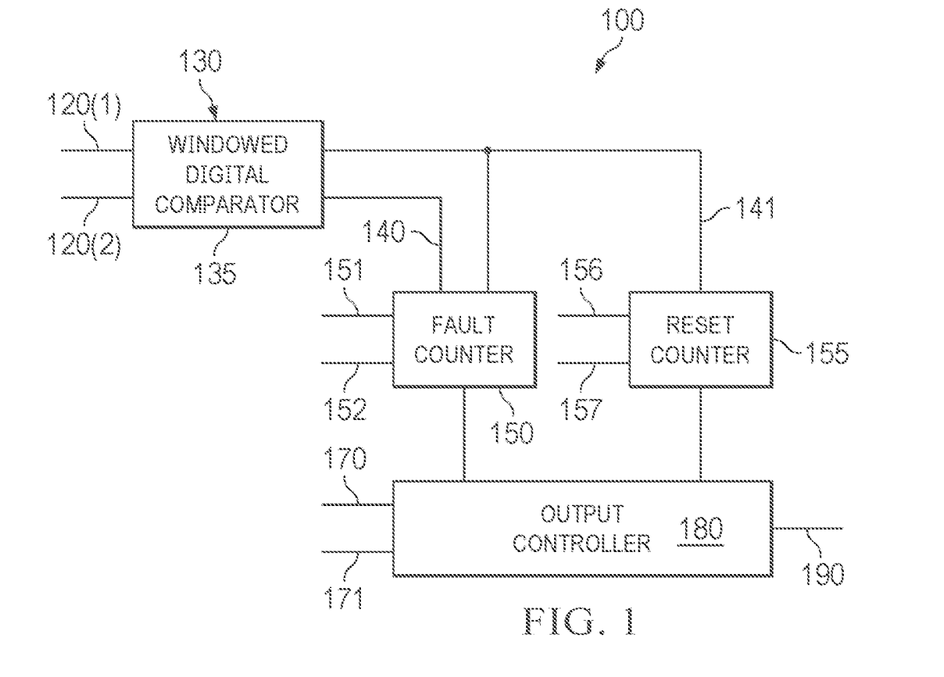
FIG. 1 illustrates one example of fault violation filter.

FIG. 1 illustrates a fault violation filter 100 for filtering threshold violations according to various examples. A digital comparator with a defined threshold window may be utilized to detect threshold violations. Windowed digital comparator 130 may receive input from one or more input data streams 120(1), 120(2). Input data streams 120(1), 120(2) may be respectively provided from an analog-to-digital converter (ADC), a sensor, or another data source capable to provide sampled digital data to windowed digital comparator 130. Input data streams 120(1), 120(2) thus may represent currents, voltages, temperatures, or other operational parameters of an electronic, mechanical or other sensor device. The example of FIG. 1 is shown with 2 input data streams 120(1), 120(2), but this is not intended to be limiting. Other examples may have more input data streams or fewer input data streams than the number of input data streams shown in FIG. 1.

Windowed digital comparator 130 may include one or more programmable thresholds and compare the respective input data streams 120(1), 120(2) against the one or more programmable thresholds. The windowed digital comparator 130 may generate outputs 140 and 141. Output 140 may be responsive to a first threshold of a plurality of thresholds, and output 141 may be responsive to a second threshold of a plurality of thresholds. Thresholds may be defined by a threshold level and a threshold type. The different threshold types may include, but are not limited to, an upper limit, a lower limit, a range which must include the input data value, or a range which must exclude the input data value. The type and level of the threshold may be set by software, or by hardware control. In one of various examples, control input 135 may set the threshold type and threshold level of each threshold. Control input 135 is shown in FIG. 1 as a single signal, but control input 135 may be a bus of signals for communication over a standard bus protocol. Comparison against a first threshold level results in a first output 140, and comparison against a second threshold level results in a second output 141.

Output 140 may be asserted based on a first threshold level and first threshold type. Output 141 may be asserted based on a second threshold level and a second threshold type. Output 140 may be input to fault counter 150. A clock input 151 may be an input to fault counter 150 and a reset input 152 may be an input to fault counter 150. Output 141 may be input to reset counter 155 and fault counter 150. A clock input 156 may be an input to reset counter 155. A reset input 157 may be input to reset counter 155.

The example illustrated in FIG. 1 illustrates two separate counters, fault counter 150 and reset counter 155. This is not intended to be limiting. The function of fault counter 150 and reset counter 155 may be implemented in a single physical counter element.

Output controller 180 may receive a respective output from fault counter 150, the output including but not limited to an indication of the count of fault counter 150, and a respective output from reset counter 155, the output including but not limited to an indication of the count of reset counter 155, and may generate fault event output 190. Fault counter limit 170 may specify a maximum value of fault counter 150, and reset counter limit 171 may specify a maximum value of reset counter 155.

Figure 2:
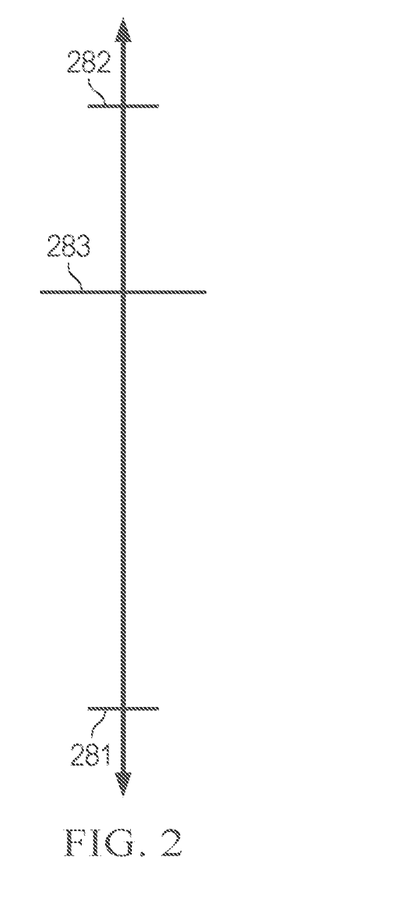
FIG. 2 illustrates one example of a threshold type.

FIG. 2 illustrates one of various examples a first threshold type and demonstrates how different threshold types may enable comparison against different input conditions. Input values to windowed digital comparator 130 may range from a minimum value indicated by label 281 to a maximum value indicated by label 282. A programmable threshold level may be set at threshold level indicated by label 283. In one of various examples, control input 135 of windowed digital comparator 130 may specify the programmable threshold type as an upper limit, and specify the threshold level as indicated by label 283, and windowed digital comparator 130 may assert an output when the input value exceeds threshold level 283. In one of various examples, control input 135 of windowed digital comparator 130 may specify the programmable threshold type as a lower limit, and windowed digital comparator 130 may assert an output when the input value is below threshold level 283.

Figure 3:
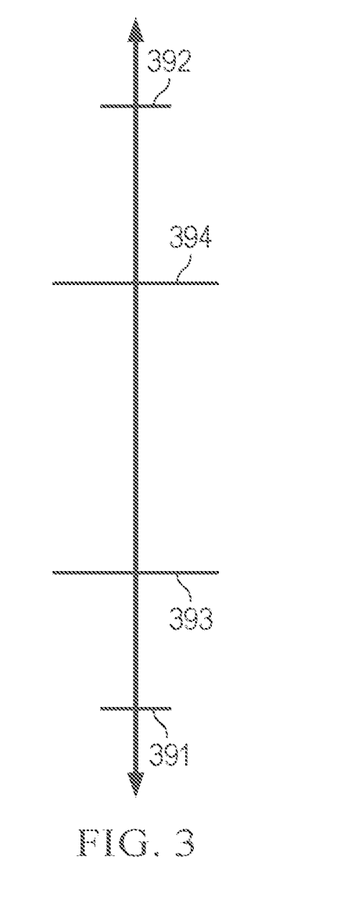
FIG. 3 illustrates a second example of a threshold type.

FIG. 3 illustrates one of various examples of a second threshold type and demonstrates how different threshold types may enable comparison against different input conditions. Input values to windowed digital comparator 130 may range from a minimum value indicated by label 391 to a maximum value indicated by label 392. A first programmable threshold level may be set at a first threshold level 393 and a second programmable threshold level may be set at a second threshold level 394. In one of various examples, control input 135 of windowed digital comparator 130 may specify the first threshold level 393, and specify the first threshold level 393 as a lower limit, and may specify the second threshold level 394, and specify the second threshold level 394 as an upper limit, defining an allowable range of values between first threshold level 393 and second threshold level 394. Windowed digital comparator 130 may assert an output when the input value is outside the allowable range between first threshold level 393 and second threshold level 394. In one of various examples, control input 135 of windowed digital comparator 130 may specify the first threshold level 393, and specify the first threshold level 393 as an upper limit, and specify the second threshold level 394, and specify the second threshold level 393 as a lower limit, defining a restricted range of values between first threshold level 393 and second threshold level 394. Windowed digital comparator 130 may assert an output when the input value is within the restricted range between first threshold level 393 and second threshold level 394.

Figure 4:
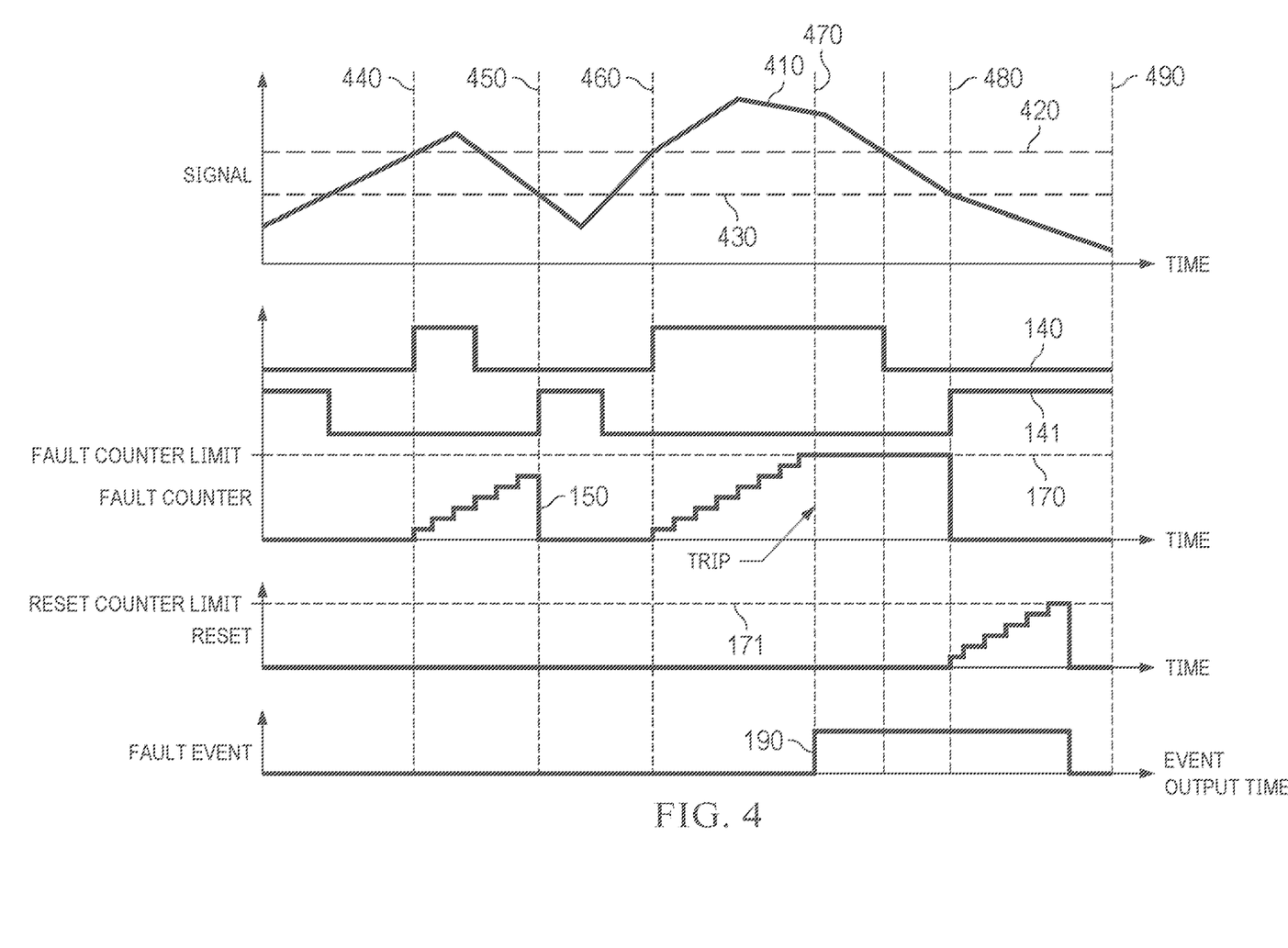
FIG. 4 illustrates a timing diagram of a system for filtering of fault conditions in one mode of operation. reset

In one of various examples illustrated in FIG. 4, a signal 410 is shown with the y-axis representing amplitude, and the x-axis representing time. Signal 410 may represent the input data stream 120(1) or 120(2) of FIG. 1. In the windowed digital comparator, a first threshold level may be defined at level 420 and is shown as a first horizontal dashed line. First threshold level 420 may be programmed as an upper limit threshold type. In the windowed digital comparator 130, a second threshold level may be defined at level 430 and is shown as a second horizontal dashed line. The second threshold level 430 may be programmed as a lower limit. Initially, as signal 410 has a value lower than both first threshold level 420 and second threshold level 430, output 140, associated with first threshold 420, may be de-asserted, and output 141, associated with second threshold level 430, may be asserted. A fault counter limit 170 may set a maximum value of fault counter 150, and a reset counter limit 171 may set a maximum value of reset counter 155. In operation, as the value of signal 410 increases, the signal level may exceed second threshold level 430 and output 141 may be de-asserted as the second threshold is defined as a lower limit. As signal 410 continues to increase in amplitude, signal 410 may exceed first threshold level 420. At time 440, first threshold level 420 is exceeded, output 140 is asserted, and fault counter 150 increments in value at each rising edge of clock input 151 until output 141 is asserted when signal 410 falls below both the first threshold level 420 and the second threshold level 430. When output 141 is asserted, the fault counter 150 value resets to zero, as shown at time 450. Fault event output 190 is not asserted during the brief excursion of input signal 410 beyond the first threshold level 420 and the second threshold level 430 as fault counter 150 does not reach fault counter limit 170. The combination of the first threshold level 420 and the second threshold level 430 may provide a hysteresis function which filters short durations of threshold violations. The example of FIG. 4 is operating in what is termed Successive Mode, as the fault counter is reset each time output 141 is asserted.

Referring again to FIG. 4, after time 450, signal 410 again begins to increase, and output 141 may be de-asserted when signal 410 exceeds second threshold level 430. At time 460, signal 410 exceeds first threshold level 420, output 140 is asserted, and fault counter 150 increments in value at each rising edge of clock input 151 while output 140 is asserted. At time 470, the value of fault counter 150 equals the fault counter limit 170 value, and fault event output 190 is asserted, e.g., set to a logic high level to indicate a failure event. fault counter 150 holds its value at the fault counter limit level. At time 480, signal 410 amplitude drops below second threshold level 430, output 141 is asserted, and reset counter 155 increments from zero. At time 490, the value of reset counter 155 reaches the reset counter limit 171, and fault event output 190 is de-asserted, e.g., is set to a logic low level.

The programmable first threshold level 420, second threshold level 430, fault counter limit 170 and reset counter limit 171 enable system designers to customize responses to different fault conditions. For a critical and potentially damaging condition, fault counter limit 170 may be set to a very low level, creating a high-bandwidth filter with a fast response time. Once a threshold is violated, fault event output 190 will be asserted very quickly. In an extreme case, fault counter limit 170 may be set to one to ensure fault event output 190 is asserted on every threshold violation. For less critical situations, a much larger value for fault counter limit 170 may create a low-bandwidth filter to only assert a fault event output after the threshold violation has persisted for a significant amount of time.

Figure 5:
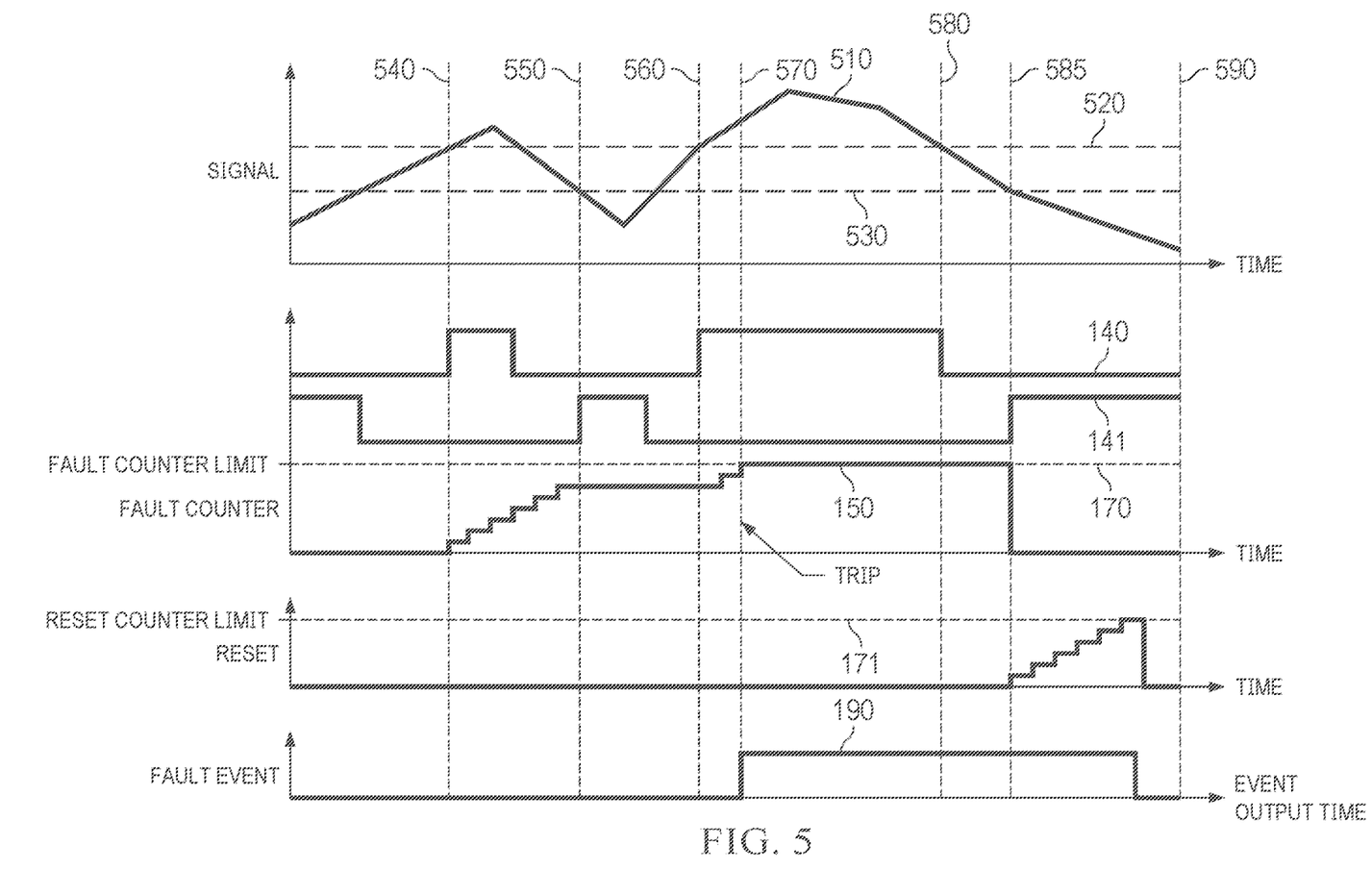
FIG. 5 illustrates a timing diagram of a system for filtering of fault conditions in a second mode of operation.

FIG. 5 illustrates fault violation filter 100 in operation according to one of various examples. The example of FIG. 5 is for illustrative purposes, and is not intended to limit the invention.

In one of various examples illustrated in FIG. 5, a signal 510 is shown with the y-axis representing amplitude, and the x-axis representing time. Signal 510 may represent input data stream 120(1) or 120(2) of FIG. 1. In the windowed digital comparator 130, the first threshold level 520 may be set as an upper limit and is shown as a first horizontal dashed line. Second threshold level 530 may be set as a lower limit and is shown as a second horizontal dashed line. Initially, as signal 510 has a value lower than both first threshold level 520 and second threshold level 530, output 140, associated with first threshold level 520, may be de-asserted, and output 141, associated with second threshold level 530, may be asserted. A fault counter limit 170 may set a maximum value of fault counter 150, and a reset counter limit 171 may set a maximum value of reset counter 155. In operation, as the value of signal 510 increases, the amplitude of signal 510 may exceed second threshold level 530 and output 141 may be de-asserted, as second threshold level 530 is defined as a lower limit. As signal 510 continues to increase in amplitude, signal 510 may exceed first threshold level 520. At time 540, first threshold level 520 is exceeded, output 140 is asserted and fault counter 150 increments in value at each rising edge of clock signal 151 while output 140 is asserted. When signal 510 falls below both the first threshold level 520 and the second threshold level 530, output 141 of FIG. 1 is asserted and fault counter 150 stops incrementing and holds its value, as shown at time 550. The example of FIG. 5 is operating in an Accumulative Mode, as the fault counter accumulates threshold violations every time output 140 is asserted, across multiple separate time windows.

Referring again to FIG. 5, after time 550, signal 510 again begins to increase, and at time 560, signal 510 exceeds first threshold level 520, output 140 is asserted, and fault counter 150 increments in value at each rising edge of clock input 151. Fault counter 150 increments from the previous held value. At time 570, the value of fault counter 150 equals fault counter limit 170, and fault event output 190 is asserted, e.g., set to a logic high level, to indicate a failure event. Fault counter 150 holds its value at the value of fault counter limit 170. At time 580, signal 510 drops below first threshold level 520 and output 140 may be de-asserted, e.g., set to a logic low value. At time 585, signal 510 drops below second threshold level 530, output 141 is asserted, and reset counter 155 increments from zero. At time 590, reset counter 155 value reaches the reset counter limit 171, and fault event output 190 is de-asserted, e.g., is set to a logic low level.

In the examples of FIG. 4 and FIG. 5, the first threshold levels 420 and 520 are shown as upper limits, and second threshold levels 430 and 530 are shown as lower limits, but this is not intended to be limiting. In various examples, the first threshold level may be a lower limit, a range of allowed values, a range of disallowed values, or another programmable condition. In various examples, the second threshold level may be a lower limit, a range of allowed values, a range of disallowed values, or another programmable condition.

In one of various examples, first threshold level 520 may be set as a lower limit, and fault counter 150 may begin counting once signal 510 has dropped below first threshold level 520.

The programmable first threshold level 520, second threshold level 530, fault counter limit 170 and reset counter limit 171 enable system designers to customize responses to different fault conditions. For a critical and potentially damaging condition, fault counter limit 170 may be set to a very low level, creating a high-bandwidth filter with a fast response time. Once a threshold is violated, fault event output 190 will be asserted very quickly. In an extreme case, fault counter limit 170 may be set to a value of one to ensure fault event output 190 is asserted on every threshold violation. For less critical situations, a much larger value of fault counter limit 170 may create a low-bandwidth filter to only assert a fault event output 190 after the threshold violation has persisted for a significant amount of time.

Figure 6:
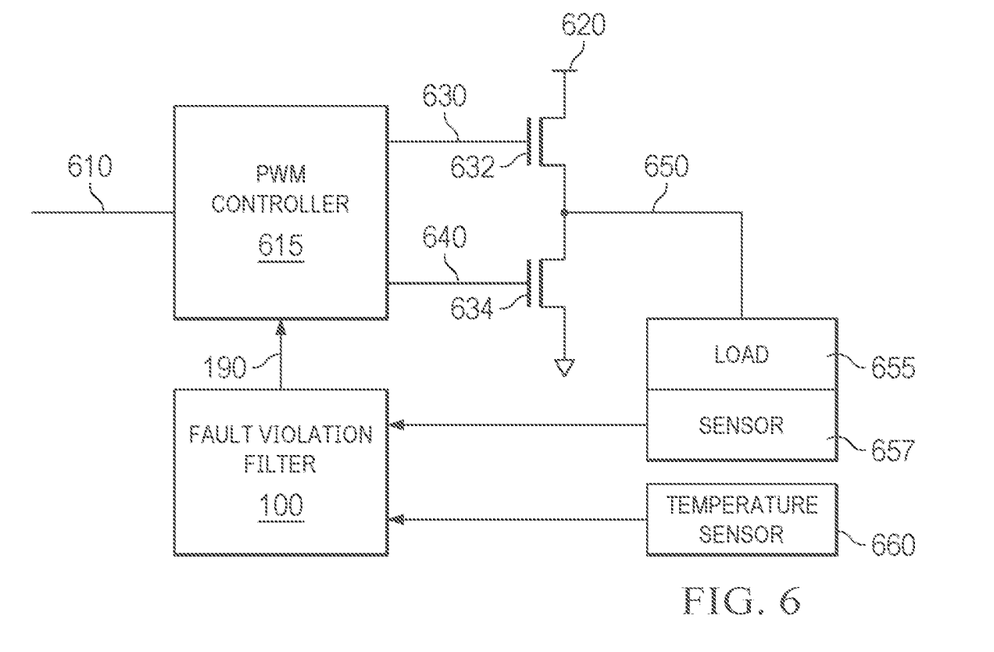
FIG. 6 illustrates a system for switched power conversion with filtering of fault conditions.

FIG. 6 illustrates one of various examples of the fault violation filter 100 as part of a switched power converter system. Input 610 is provided to PWM controller 615. PWM controller 615 may generate a high-side gate drive signal 630 and a low-side gate drive signal 640. High-side gate drive signal 630 may drive the gate of high-side device 632. Low-side gate drive signal 640 may drive the gate of low-side device 634. Output 650 may drive a Load 655. Temperature sensor 660 may monitor the temperature of the low-side device 634 and the high-side device 632. Temperature input 661 may be input to fault violation filter 100 as data input stream 120(1). Sensor 657 may monitor current delivered to load 655. Sensor output 658 may be input to fault violation filter 100 as data input stream 120(2) and may provide a digital representation of the current delivered to load 655.

Fault violation filter 100 may be programmed with a first and second threshold level, and with a fault counter limit 170 and a reset counter limit 171 as previously disclosed. Fault violation filter 100 may assert fault event output 190 based on temperature input 661 indicative of exceeding a threshold condition. Fault violation filter 100 may assert fault event output 190 based on current value 658 exceeding a threshold condition.

PWM controller 615 may receive fault event input 190 and respond to preserve the overall system. In the event of a fault event 190 assertion from a temperature threshold violation, PWM controller 615 may immediately disable the low-side gate drive 640 and the high-side gate drive 630. In the event of a fault event output 190 assertion from an overcurrent threshold violation, PWM controller 615 may adjust the low-side gate drive 640 and the high-side gate drive 630 to reduce the output 650 and eliminate the overcurrent condition.

These responses to Fault Event conditions are merely for explanatory purposes, and are not intended to be limiting. System designers may take a fault event 190 signal and adjust the overall system in any manner to preserve the system.

The example of FIG. 6 includes measurement of temperature and current, but this should not be interpreted as limiting. Data input streams 120(1) and 120(2) to fault violation filter 100 may represent temperature, current, voltage, motion, or any other parameter of interest to system designers.

In operation in one of various examples, windowed digital comparator 130 may take as data input stream 120(1) a digital value representing a voltage. A first threshold level may be set to be an upper limit on the input voltage from the voltage measurement in order to monitor the electronic device for an overvoltage condition. The second threshold level may be set as a lower limit to clear the overvoltage condition once the input has dropped to a level below both the first threshold and the second threshold.

In operation in one of various examples, windowed digital comparator 130 may take as input data stream 120(1) a digital value representing a current. The first threshold level may be set to be a lower limit on the input current measurement in order to monitor the electronic device for a low current condition. The second threshold level may be set as an upper limit to clear the low current condition once the input has risen to a level above both the first threshold and the second threshold.

Programmable fault response sensitivity behavior improves system performance. Adjustments to threshold levels at runtime allows adaptive tightening of design margins, enhancing fault detection. Signal conditions can be observed at runtime, allowing detection of critical conditions early (before a system exceeds a fault limit), while reducing the load on the processor to free up resources for other processor intensive real-time code, such as control loop algorithms.

The invention claimed is:

1. A device comprising:
 a digital comparator to receive a digital input value, wherein the digital comparator generates a plurality of outputs comprising at least a first output based on a first programmable threshold value and a second output based on a second programmable threshold value, the first programmable threshold value different from the second programmable threshold value;
 a first counter coupled to the first output of the plurality of outputs of the digital comparator;
 a second counter coupled to the second output of the plurality of outputs of the digital comparator, and
 an output controller with a first input coupled to an output of the first counter and a second input coupled to an output of the second counter, the output controller to generate a filtered fault event signal based at least partially on the output of the first counter and the output of the second counter,
 wherein the output controller asserts a fault event output based at least on a value of the first counter, a first programmable counter limit, a value of the second counter, and a second programmable counter limit and
 wherein the first and second counters respectively comprise a reset input, and a clock input, and
 wherein in a first operating mode, a reset input of the first counter is coupled with the second output of the plurality of outputs of the digital comparator wherein the first counter stops counting when the first counter exceeds a first programmable counter limit, and is reset by the second output of the plurality of outputs of the digital comparator, and wherein the second counter is reset when the second counter exceeds a second programmable counter limit.

2. The device as claimed in claim 1, wherein the first programmable threshold value comprises at least one of an upper limit applied to the digital input value and a lower limit applied to the digital input value.

3. The device as claimed in claim 1, wherein the second programmable threshold value comprises at least one of a range of allowed digital input values and a range of restricted digital input values.

4. The device as claimed in claim 1, wherein the first and second counter respectively to count samples of a respective one of the plurality of outputs of the digital comparator.

5. The device as claimed in claim 1, wherein the second counter comprises a decoder to reset the first counter based on the value of the second counter and a programmable condition.

6. The device as claimed in claim 1, wherein in a second operating mode, the first counter stops counting when the first counter exceeds the first programmable counter limit or when the second output of the digital comparator is asserted, and wherein the first and second counter are reset when the second counter exceeds the second programmable counter limit.

7. The device as claimed in claim 1, wherein the device is a programmable peripheral device in a microcontroller.

8. A microcontroller comprising a programmable threshold violation filter, wherein the programmable threshold violation filter comprises:
   a digital comparator to receive a digital input value, wherein the digital comparator generates a plurality of outputs based on a first programmable threshold value and a second programmable threshold value, the first programmable threshold value different from the second programmable threshold value;
   a first counter coupled to at least one of the plurality of outputs of the digital comparator;
   an output controller with a first input coupled to an output of the first counter, the output controller to assert a fault event output when the first counter exceeds a first programmable counter limit and to reset the fault event signal when the first counter exceeds a second programmable counter limit;
   a second counter coupled to at least one of the plurality of outputs of the digital comparator and an output controller with a second input coupled to an output of the second counter, the output controller to assert a fault event output when the first counter exceeds the first programmable counter limit and to reset the fault event signal when the second counter exceeds the second programmable counter limit, and wherein in a first operating mode, the first counter starts counting when the first output of the plurality of outputs of the digital comparator is asserted, the first counter stops counting when the first counter exceeds the first programmable counter limit, and the first counter is reset by the second output of the plurality of outputs of the digital comparator, and wherein the second counter starts counting when the second output of the plurality of outputs of the digital comparator is asserted and the first counter exceeds the first programmable counter limit, and the second counter is reset when the second counter exceeds the second programmable counter limit.

9. The microcontroller as claimed in claim 8, wherein in a second operating mode, the first counter starts counting when the first output of the digital comparator is asserted, the first counter stops counting when the first counter exceeds the first programmable counter limit or when the second output of the digital comparator is asserted, and the first counter is reset when the second counter exceeds the second programmable counter limit, and wherein the second counter starts counting when the second output of the digital comparator is asserted and the first counter exceeds the first programmable counter limit, and the second counter is reset when the second counter the second programmable counter limit.

* * * * *